Nov. 30, 1948.   C. D. OUGHTON ET AL   2,455,085
APPARATUS FOR TEMPERING GLASS ARTICLES
Filed Jan. 23, 1943
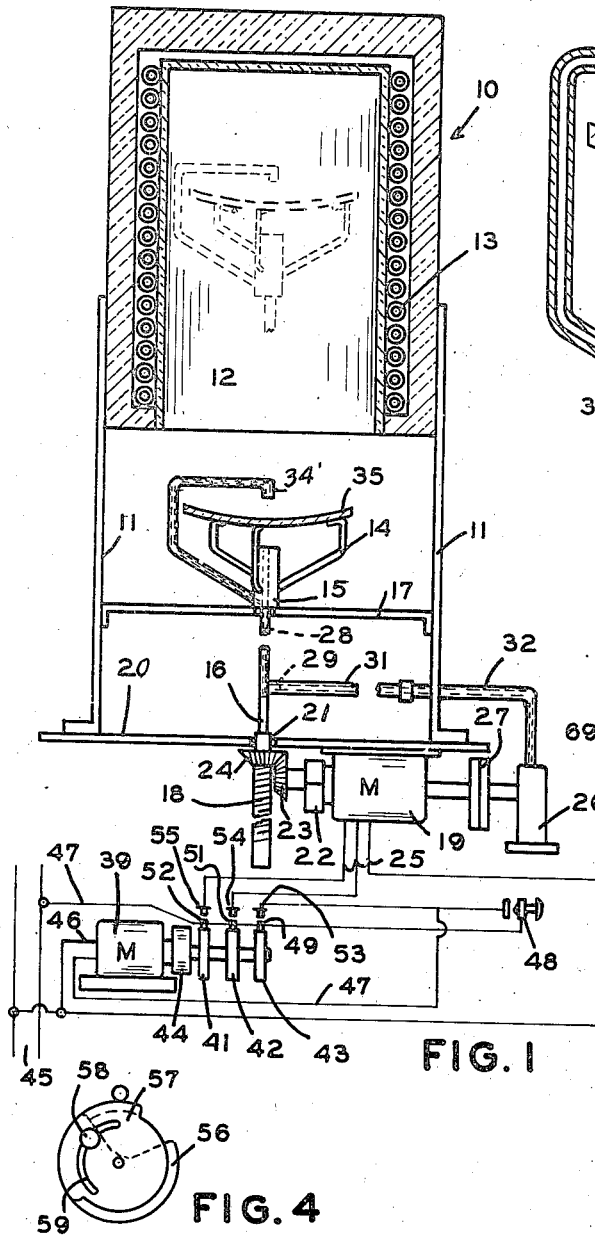
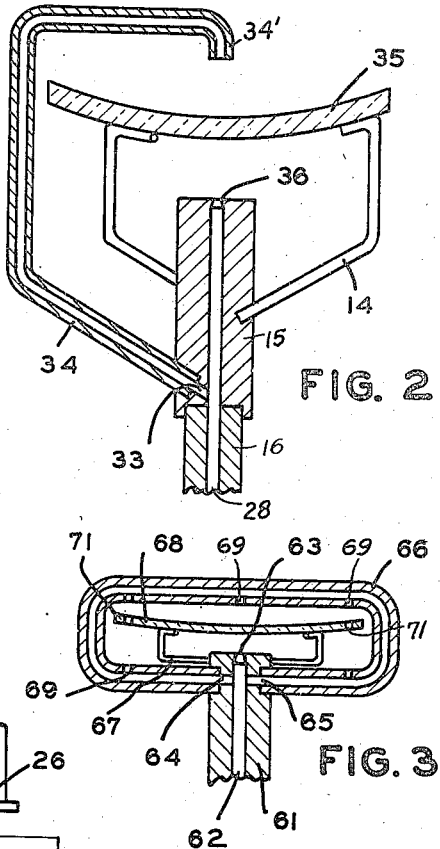
CHARLES D. OUGHTON
SCOTT STERLING
ARTHUR F. TURNER
INVENTORS
BY
ATTORNEYS Patented Nov. 30, 1948

2,455,085

UNITED STATES PATENT OFFICE 2,455,085

APPARATUS FOR TEMPERING GLASS ARTICLES

Charles D. Oughton, Rochester, Scott Sterling, Irondequoit, and Arthur F. Turner, Brighton, N. Y., assignors to Bausch & Lomb Optical Company, Rochester, N. Y., a corporation of New York Application January 23, 1943, Serial No. 473,326

5 Claims. (Cl. 49—45)

This invention relates to an apparatus for tempering certain frangible materials and more particularly to an apparatus for tempering glass or the like.

The tempering apparatus of the present invention may be used for tempering a number of articles formed of glass or like material but is particularly useful for tempering goggle and spectacle lenses against mechanical shock. Since the advent of safety goggles in the industrial field, the use of these goggles has become quite common. The lenses of such goggles are generally tempered by the manufacture in mass quantity before the lenses are mounted. The equipment used usually consists of a relatively large furnace for continuously heating a large number of lenses which were automatically cooled after a predetermined stay within the heating furnace.

As the use of such goggles increased it has been necessary to furnish certain workmen special lenses for their safety goggles to correct subnormal vision. In such instances it was necessary generally to forward the workman's prescription to the goggle manufacturer, who then performed the special grinding required before the lenses were tempered. This procedure naturally was inconvenient for the employer as well as the workman.

This difficulty has brought about a demand for equipment which could be used by opticians or the like for tempering lenses having special surfaces ground thereon. To meet this demand, as well as a growing one for tempered spectacle lenses, a number of devices have been proposed whereby the optician or the like could harden the lenses after the prescription had been ground into the same. The devices heretofore proposed for tempering the lenses have not met with any great success, for in the majority of cases they were bulky, requiring more or less skillful supervision and were often difficult to operate.

The device of the present invention obviates many of the difficulties heretofore encountered in the use of the previously proposed devices for the same is compact and can be used by a comparatively unskilled operator. The device as now preferred comprises a small furnace for heating the lens after a support for holding the same has moved the lens into the furnace. The lens, after it has been heated, is preferably cooled by air streams directed against the surfaces of the same.

To simplify the construction, as well as the use of the device the lens support carries a plurality of nozzles for directing the air streams against the heated lens, and to this end the support includes a conduit for leading the air from a source to the nozzles carried by the support.

In the now preferred embodiment of the device of the present invention, means are provided for moving the lens-holding support into the furnace after the lens has been placed thereon. To simplify the use and operation of the device, this means is made operative by a control means which not only determines the duration of the heating period but automatically at the termination thereof actuates an air compressing means for supplying the cooling air stream to the optical surfaces of the lens. The control means is also operative to simultaneously actuate the support-moving means to cause the same to withdraw the lens-holding support from the furnace and thereafter render the air compressing means inoperative.

Thus the device is quite easy to operate for a user merely places the lens to be tempered on the support and by actuation of the control means causes the lens to be moved into the furnace and through the particular mechanism of the device of the present invention the lens is automatically withdrawn from the furnace after the required heating period and may be removed from the support as soon as the air compressing means is no longer operative.

In the one form of the support now preferred the nozzles carried thereby direct the air streams against the medial portion of the opposite surfaces of the lens. In the form of the support preferred for use in tempering lenses drilled for the usual attaching means of the so-called rimless or semi-rimless mounting means, the nozzles direct the air streams not only against the opposite surfaces of the lens in the medial portions thereof but against the surfaces adjacent the drilled holes as well.

Other features and advantages of the apparatus of the present invention will appear from the following description taken in connection with the accompanying drawing:

Fig. 1 is an elevational view partly in section of the furnace and lens-holding support of the present invention together with a diagrammatic view of the operating and control mechanism therefor.

Fig. 2 is a sectional view of one form of the lens-holding support of the present invention.

Fig. 3 is a view similar to Fig. 2 but showing a modified form of the lens-holding support.

Fig. 4 is an elevational view of one of the adjusting cams of the control mechanism of the present invention.

The device of the present invention, referring now to Fig. 1 of the drawing, comprises a furnace 10 supported by a plurality of legs 11. The furnace 10 may be formed of any suitable insulation material desired, and houses a chamber 12 heated by some conventional means such as the resistance unit 13. The chamber 12 in the form now preferred is vertically disposed relative to the furnace and is open at the lower end thereof. It will be obvious from the following description of the invention, however, that the chamber may be horizontally disposed in the furnace if desired.

Although any means desired may be used to move the lens into the heating chamber 12, in the now preferred form of the invention, the lens is moved into the chamber by means of a support comprising a plurality of fingers 14 carried by a cap 15 detachably mounted to the upper end of a shaft 16, reciprocally mounted for vertical movement beneath the furnace 10.

The shaft 16 is journaled at the upper end thereof in a frame 17 extending between the supporting legs 11 and carries at the lower end thereof an enlarged screw shaft 18. Any suitable bearing desired may be used to support the lower end of the shaft.

Although the shaft 16 may be raised and lowered by hand, it is now preferred to do this by an electric motor 19 suspended beneath the base 20 which is formed with a suitable aperture 21 for passing the screw shaft 18. The motor 19 through a change speed mechanism 22 drives a bevel gear 23 meshing with a similar gear 24 formed with an internal thread engaging and driving the screw shaft 18. It will be seen that when the motor is energized the mechanism 22 and the gears 23 and 24 will drive the shaft 16 upwardly or downwardly, depending upon the direction of the rotation of the motor 19. The motor, therefore, should be so wound that it can be reversed and as shown here is supplied with leads 25 for reversing the flow of current through the field thereof.

The motor 19 is also used in the now preferred form of the device of the present invention for operating an air compressing means such as a compressor 26. As the air is to be used for cooling a lens after it has been heated within the chamber 12, a clutch 27 interposed between the motor 19 and the air compressor 26 limits operation of the air compressor and the motor will drive the same only when the motor is rotating in the direction necessary to cause the shaft 16 to move downwardly and out of the furnace 10.

To simplify the construction as well as the use of the device of the present invention, the lens-holding support carries the nozzles for directing the air streams against the heated lens and to this end the shaft 16 is formed with a passageway 28 and a nipple 29 for taking one end of a flexible tubing 31. The opposite end of the flexible tubing 31 is connected to a pipe 32 leading from the air compressor 26.

The detachable cap 15 is formed with a passageway therethrough which forms a continuation of the passageway 28 when the cap 15 is secured to the shaft 16. The cap 15, as best shown in Fig. 2, is also provided with a laterally extending passageway 33 having the mouth thereof enlarged to take the one end of a tube 34 which is laterally bent to extend above the cap 15 and then laterally to extend over the same. The tube is formed at the upper end thereof with a nozzle 34' directed downwardly toward the top of the cap 15. The bore of the tube 34 is substantially equal to the diameter of the passageway 28 and will carry the air supplied thereto up over the cap to the nozzle 34' which directs an air stream downwardly against the upper surface of a lens 35 supported by the fingers 14.

To insure that air will enter the tube 34, a nozzle 36 is formed at the upper end of the passageway 28 by restricting the same which causes pressure to be built up in the passageway 28 sufficient to force air out through the tube 34 as well as the nozzle 36.

Although the motor 19 might be operated through a suitable manual switch, in the now preferred embodiment of the device of the present invention, the motor is controlled by control mechanism which not only energizes the motor for moving the lens up into the chamber 12 but also times the duration of the heating period and automatically at the termination thereof causes the motor to be reversed whereupon the air compressor is driven to supply air to the nozzle of the lens holding the support as the same is being withdrawn from the chamber. The control means of the present invention also include means for breaking the motor circuit after the lens has been withdrawn from the furnace and has been cooled by the air stream generated by the air compressor 26.

The control means may take a number of different forms but as shown, referring now to Fig. 1, this means comprises a synchronous motor 39 driving cams 41, 42, and 43 through a suitable reduction gearing 44.

The motor 39 may be energized from a suitable force of current such as the line 45 by conductors 46 and 47. The conductor 47 has a manually operable switch 48 positioned therein and is in electrical engagement with contacts 49, 51, and 52 carried by follower members engaging the working faces of the cams 43, 42, and 41, respectively.

The contacts 49, 51, and 52 form movable contact members of switches 53, 54, and 55, respectively. The switches 53, 54, and 55 are connected by suitable conductors to the leads 25 of the motor 19. In the form of the device now preferred the switches 53, 54, and 55, are normally held open by suitable springs, not shown, which also hold the follower members carrying the contacts 49, 51, and 52, against the working faces of the cams 43, 42, and 41, respectively. The working faces of the cams are adjustable for, as clearly shown in Fig. 4, each cam comprises a pair of discs 56 and 57 held in adjustable facewise engagement by means of a screw 58 carried by the disc 56. The screw 58 rides in a slot 59 formed in the disc 57 and permits the discs 56 and 57 to be adjusted about their common center to relatively adjust the low and high spots of the working face of each cam.

In using the device, determination is first made of the heating time for the lens. This depends upon the weight of the lens, type of glass used for making the lens and also upon the operating temperature of the oven 12. The cam 43 is then adjusted so as to hold the switch 53 closed for a complete operation cycle. The cam 42 is adjusted so that it will close the switch 54 only for a period sufficient for the motor 19 to drive the lens into the oven chamber 12. The cam 41 is then adjusted so that it will close and hold closed the switch 55 for a period sufficient for the motor 19 to withdraw the lens from the oven chamber 12. When these adjustments have been made, the switch 48 is manually closed and held closed until the motor 39 has driven the cam 43 to a position in which working face thereof has moved the follower-carried contact 49 into engagement with the fixed contact of the switch 53. It will be seen that upon closing of the switch 53 the manually operated switch 48 may be released for the motor 39 will be energized through a circuit including the line conductors 46 and 47 through switch 53 and then back to the line 45. The cam 42 is so adjusted that immediately after the closing of the switch 53 the switch 54 through cam 42 will be closed to energize the motor 19 to cause the same, through the gear train heretofore described, to drive the shaft 16 upwardly until the lens is supported in its proper position within the chamber 12. The air compressor 26 will not be driven at this time as the clutch 27 will not transmit this driving force of the motor. The switch 54 is then opened after the lens has been moved up into the chamber 12. After the elapse of the heating period the switch 55 will be closed automatically through cam 41 and contact 52 and the closing of the switch 55 reverses the flow of current to the field coils of the motor 19 and the motor will be driven in the opposite direction. The motor 19 when thus energized will drive the shaft 16 downwardly and simultaneously therewith, through the clutch 27, drive the air compressor 26 to cause the same to supply to the nozzles 34' and 36 of the lens-holding support cooling air streams which are directed against the opposite surfaces of the lens 35 while the same is still within the chamber 12. The motor 19 will be energized for a time sufficient to withdraw the lens 35 from the chamber and for a longer period thereafter if necessary to cool the lens to the desired low temperature. When the lens reaches this temperature the switch 55 will be opened whereupon the motor 19 is de-energized. When switch 53 is opened by cam 43 the motor 39 will be de-energized and the mechanism will be in a position wherein the entire cycle may again be repeated by manually closing the switch 48.

There is shown in Fig. 3 a modified form of the lens-holding support adapted particularly for holding drilled lenses which are to be mounted in the so-called rimless or semi-rimless mountings. In this form of the support the cap 61 which is adapted to be removably attached to the shaft 16 is formed with a passageway 62 which forms a continuation of the passageway 28 when the cap is fixed to the shaft 16. The passageway 62 is formed with a nozzle 63 by restricting the mouth thereof, which insures that air will be delivered to the passageways 64 and 65 leading from opposite sides of the pasageway 62. A tubular member 66 has its opposite ends secured in enlarged mouth portions of the passageways 64 and 65 and the bore thereof forms a continuation of the passageways 64 and 65. The tubular member 66 extends around a plurality of fingers 67 which form a support for holding the lens 68. The one wall of the tubular member 66 is formed with a plurality of apertures 69, forming nozzles for directing streams of air against the opposite surfaces of the heated lens 68. In this embodiment of the invention aligned pairs of the openings or nozzles 69 are spaced so as to direct air streams against the opposite surfaces of the lens 68 adjacent to the openings 71 drilled through the lens at opposite sides thereof for taking the rivets or the like used to secure the lens in the mounting. One of the openings formed in the wall of the tubular member 66 lies just above the nozzle 63 of the passageway 62 and cooperates with the same for directing air streams against the medial region of the opposite surfaces of the lens.

It will be seen that the device of the present invention is extremely simple in operation and needs no skillful supervision as did many of the previous devices for tempering lenses. As the device is compact it can be stored and operated in a minimum of space so that it is well adapted for use by the average optician or the like.

While certain preferred embodiments of the invention have been illustrated and described herein, it is to be understood that the invention is not limited thereby but is susceptible of changes in form and detail within the scope of the appended claims.

We claim:

1. In a device of the type described, a chamber; means for heating said chamber; means for supporting a mass of glass; a plurality of nozzles associated with said supporting means and adapted to direct air blasts against the opposite surfaces of said mass held by said supporting means; means for movably mounting said supporting means relative to said chamber; means for moving said supporting means into said chamber whereby said mass may be heated therein; adjustable means for selectively timing the period said mass remains in said chamber and adapted after a predetermined length of time to actuate said moving means whereby the same withdraws said supporting means from said chamber; air compressing means; and means connecting said air compressing means to said nozzles, said air compressing means being operated by said moving means at least during the withdrawal movement of said supporting means whereby cooling air blasts are directed against opposite surfaces of said mass to cool the same.

2. In a device of the type described, a chamber; means for heating said chamber; means for supporting a disc of glass; means for movably mounting said supporting means; means for reciprocally moving said supporting means into and out of said chamber; means for controlling said moving means; said controlling means adapted to actuate said moving means to cause the same to move said supporting means into said chamber and upon the elapse of a predetermined time cause the same to withdraw said supporting means from said chamber; means for compressing air; means for actuating said air compressing means upon operation of the moving means in withdrawing said supporting means for directing air blasts against the opposite surfaces of said disc.

3. In a device of the type described, a chamber; means for heating said chamber; mans for supporting a disc of glass; means for movably mounting said supporting means; means for moving said supporting means into said chamber whereby said disc may be heated therein; time controlled means for controlling the operation of said support-moving means whereby said moving means is made operable to move said supporting means into said chamber and hold the same therein for a predetermined length of time and thereafter remove said supporting means from said chamber; means for compressing air; air directing means carried by said supporting means adapted to direct air streams against opposite surfaces of a disc held by said supporting means; air conducting means interconnecting said air compressing means and the air directing means of said supporting means; and means, actuated by said moving means in removing said supporting means from said chamber, for operating said air compressing means whereby cooling air streams are directed against opposite surfaces of said disc simultaneously with the removal of said supporting means from said chamber.

4. In a device of the type described, the combination of a heated chamber having an opening at the bottom thereof, a rigid tube movably mounted beneath said chamber, a plurality of spaced fingers carried by the upper end of the tube for holding a lens to be treated, mechanism for moving said tube vertically to bring the lens into and out of the chamber through the opening, nozzles connected to the upper end of the tube for directing air blasts onto opposite surfaces of the lens, an air compressor, and a flexible conduit connecting the compressor to the lower end of the tube whereby air blasts may be directed onto the lens while it is in the chamber.

5. In a device of the type described, the combination of a heated chamber having an opening at the bottom thereof, a rigid tube movably mounted beneath said opening, spaced fingers on the upper end of the tube for supporting a lens, mechanism for moving said tube for bringing the lens into and out of said chamber through the opening, air compressing means connected to the lower end of the tube, nozzles connected to the upper end of the tube for directing blasts of air onto opposite faces of the lens, and timing means operatively connected to the mechanism and air compressing means for controlling the operation of the mechanism and rendering the air compressing means operative as the mechanism withdraws the lens from the chamber.

CHARLES D. OUGHTON.
SCOTT STERLING.
ARTHUR F. TURNER.

REFERENCES CITED

The following references are of record in the file of this patent:

UNITED STATES PATENTS

| Number | Name | Date |
|---|---|---|
| 1,809,534 | Tillyer et al. | June 9, 1931 |
| 2,054,595 | Clitherow | Sept. 15, 1936 |
| 2,111,370 | Owen | Mar. 15, 1938 |
| 2,144,320 | Bailey | Jan. 17, 1939 |
| 2,166,348 | Ford, Jr. | July 18, 1939 |
| 2,269,060 | Mitford | Jan. 6, 1942 |

FOREIGN PATENTS

| Number | Country | Date |
|---|---|---|
| 505,188 | Great Britain | May 5, 1939 |
| 616,445 | Germany | July 29, 1935 |